(12) United States Patent
Sivan et al.

(10) Patent No.: US 11,755,984 B2
(45) Date of Patent: Sep. 12, 2023

(54) ADAPTIVE POSITIONING OF DRONES FOR ENHANCED FACE RECOGNITION

(71) Applicant: Anyvision Interactive Technologies Ltd., Holon (IL)

(72) Inventors: Ishay Sivan, Tel-Aviv (IL); Ailon Etshtein, Tel-Aviv (IL); Alexander Zilberman, Holon (IL); Neil Martin Robertson, Holywood (GB); Sankha Subhra Mukherjee, Belfast (GB); Rolf Hugh Baxter, Holywood (GB); Ohad Shaubi, Yavne (IL); Idan Barak, Kfar Aviv (IL)

(73) Assignee: Anyvision Interactive Technologies Ltd., Holon (IL)

( * ) Notice: Subject to any disclaimer, the term of this patent is extended or adjusted under 35 U.S.C. 154(b) by 0 days.

(21) Appl. No.: 16/933,016

(22) Filed: Jul. 20, 2020

(65) Prior Publication Data

US 2021/0034843 A1 Feb. 4, 2021

Related U.S. Application Data

(60) Provisional application No. 62/881,414, filed on Aug. 1, 2019.

(51) Int. Cl.
*G06Q 10/083* (2023.01)
*G06T 7/70* (2017.01)
(Continued)

(52) U.S. Cl.
CPC ......... *G06Q 10/083* (2013.01); *B64C 39/024* (2013.01); *G06F 18/22* (2023.01); *G06F 18/24* (2023.01); *G06T 7/70* (2017.01); *G06V 10/75* (2022.01); *G06V 20/10* (2022.01); *G06V 20/13* (2022.01); *G06V 20/17* (2022.01);
(Continued)

(58) Field of Classification Search
CPC ............ G06K 9/00288; G06K 9/6267; G06K 9/6201; G06T 7/70; G06T 2207/30201; G06T 2207/20081; H04N 7/185; B64C 39/024; B64C 2201/128; G06Q 10/083
See application file for complete search history.

(56) References Cited

U.S. PATENT DOCUMENTS

| 2018/0144302 A1* | 5/2018 | Murray | G07C 9/37 |
| 2018/0259960 A1* | 9/2018 | Cuban | H04N 5/232 |
| 2019/0055019 A1* | 2/2019 | Myslinski | G05D 1/0088 |

* cited by examiner

*Primary Examiner* — Ruiping Li

(57) ABSTRACT

Presented herein are systems, methods and apparatuses for increasing reliability of face recognition in analysis of images captured by drone mounted imaging sensors, comprising: recognizing a target person in one or more iterations, each iteration comprising: identifying one or more positioning properties of the target person based on analysis of image(s) captured by imaging sensor(s) mounted on a drone operated to approach the target person, instructing the drone to adjust its position to an optimal facial image capturing position selected based on the positioning property(s), receiving facial image(s) of the target person captured by the imaging sensor(s), receiving a face classification associated with a probability score from machine learning model(s) trained to recognize the target person, and initiating another iteration in case the probability score does not exceed a certain threshold. Finally, the face classification may be outputted for use by one or more face recognition based systems.

12 Claims, 2 Drawing Sheets

(51) Int. Cl.
  *H04N 7/18* (2006.01)
  *B64C 39/02* (2023.01)
  *G06V 40/16* (2022.01)
  *G06F 18/22* (2023.01)
  *G06F 18/24* (2023.01)
  *G06V 10/75* (2022.01)
  *G06V 20/13* (2022.01)
  *G06V 20/17* (2022.01)
  *G06V 20/10* (2022.01)
  *B64U 101/60* (2023.01)

(52) U.S. Cl.
  CPC ............ *G06V 40/172* (2022.01); *H04N 7/185* (2013.01); *B64U 2101/60* (2023.01); *G06T 2207/20081* (2013.01); *G06T 2207/30201* (2013.01)

ADAPTIVE POSITIONING OF DRONES FOR ENHANCED FACE RECOGNITION

RELATED APPLICATION(S)

This application claims the benefit of priority under 35 USC § 119(e) of U.S. Provisional Patent Application No. 62/881,414 filed on Aug. 1, 2019, the contents of which are all incorporated by reference as if fully set forth herein in their entirety.

FIELD AND BACKGROUND OF THE INVENTION

The present invention, in some embodiments thereof, relates to face recognition based on image analysis, and, more specifically, but not exclusively, to enhancing face recognition based on image analysis by dynamically adapting a position of a drone to improve visibility of the face in images captured by drone mounted imaging sensors.

In the past, the use of Unmanned Aerial Vehicles (UAVs) was mainly restricted to military applications and uses due to the high cost of this technology and the resources required for deploying and maintaining such UAVs.

However, recent years have witnessed constant advancements in UAV technology, specifically drone technology (increased range, improved reliability, etc.) and increased availability of cost effective drone solutions. These have led to appearance and rapid evolution of a plurality of commercial and/or recreational drone based applications, systems and services such as, for example, drone automated delivery services, public order systems, security systems, surveillance systems and/or the like.

Where delivery services are concerned, traditional delivery companies such as UPS and FedEx for example, may deliver goods (items) to customers using delivery vehicles (e.g., trucks) which are operated by delivery people. The delivery vehicles travel a predetermined route and deliver packages to customer locations along the route. At the customer location, the delivery person may verify the identity of the person to whom the goods are delivered and/or verify that the delivery location (e.g., customer address) is correct and leave the package in a safe place at the delivery location.

Many of these drone based applications are based on recognizing and identifying people. However, since these applications are mostly automated, the recognition of the people needs to also be done automatically using one or more recognition methods, techniques and/or algorithms mainly face recognition.

SUMMARY OF THE INVENTION

According to a first aspect of the present invention there is provided a computer implemented method of increasing reliability of face recognition in analysis of images captured by drone mounted imaging sensors, comprising:
  Recognizing a target person in one or more iterations. Each iteration comprising:
    Identifying one or more positioning properties of the target person based on analysis of one or more image captured by one or more imaging sensors mounted on a drone operated to approach the target person.
    Instructing the drone to adjust its position to an optimal facial image capturing position selected based on the one or more positioning properties.
    Receiving one or more facial images of the target person captured by the one or more imaging sensors while the drone is located at the optimal facial image capturing position.
    Receiving a face classification associated with a probability score from one or more machine learning models trained to recognize the target person which is applied to the one or more facial images.
    Initiating another iteration in case the probability score does not exceed a certain threshold.
  Outputting the face classification for use by one or more face recognition based systems.

According to a second aspect of the present invention there is provided a system for increasing reliability of face recognition in analysis of images captured by drone mounted imaging sensors, comprising one or more processor executing a code. The code comprising:
  Code instructions to recognize a target person in one or more iteration. Each iteration comprising:
    Identifying one or more positioning properties of the target person based on analysis of one or more image captured by one or more imaging sensors mounted on a drone operated to approach the target person.
    Instructing the drone to adjust its position to an optimal facial image capturing position selected based on the one or more positioning properties.
    Receiving one or more facial images of the target person captured by the one or more imaging sensors while the drone is located at the optimal facial image capturing position.
    Receiving a face classification associated with a probability score from one or more machine learning models trained to recognize the target person which is applied to the one or more facial images.
    Initiating another iteration in case the probability score does not exceed a certain threshold.
  Code instructions to output the face classification for use by one or more face recognition based system.

In a further implementation form of the first and/or second aspects, each of the one or more positioning properties is a member of a group consisting of: a head pose of the target person, a property of one or more potentially blocking object with respect to the target person and/or one or more environmental parameter affecting image capturing of the target person.

In a further implementation form of the first and/or second aspects, the optimal facial image capturing position is defined by one or more position parameters of the drone. Each of the one or more position parameters is a member of a group consisting of: a location of the drone with respect to the target person, a distance of the drone from the target person, an altitude of the drone with respect to the target person and a view angle of the one or more imaging sensor mounted on the drone with respect to the head pose identified for the target person.

In an optional implementation form of the first and/or second aspects, one or more operational parameters of one or more of the imaging sensors are adjusted based on the one or more of the positioning properties. The one or more operational parameter comprising a resolution, a zoom, a color, a field of view, an aperture, a shutter speed, a sensitivity (ISO), a white balance and/or an auto exposure.

In a further implementation form of the first and/or second aspects, one or more of the machine learning models are based on a neural network.

In a further implementation form of the first and/or second aspects, the face classification is done locally at the drone.

In a further implementation form of the first and/or second aspects, at least part of the face classification is done by one or more remote systems connected to the drone via one or more networks to receive the one or more images captured by the one or more imaging sensors mounted on the drone.

In an optional implementation form of the first and/or second aspects, a plurality of iterations are initiated to capture a plurality of facial images depicting the face of the target person from a plurality of view angles to form an at least partial three dimensional (3D) representation of at least part of a head of the target person.

In a further implementation form of the first and/or second aspects, the face recognition based system is an automated delivery system using the face classification for authenticating an identity of the target person for delivery of goods to the target person.

In an optional implementation form of the first and/or second aspects, one or more of the iterations for recognizing the target person are initiated in correlation with the goods at a time of delivery.

In an optional implementation form of the first and/or second aspects, a location of the target person where the one or more images is captured for recognizing the target person is different form the location of the target person during the time of delivery.

In an optional implementation form of the first and/or second aspects, the drone is instructed to initiate one or more additional authentication sequences. The additional authentication sequences comprising manual signature of the target person, a biometric authentication of the target person and/or a voice authentication of the target person.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the Drawings.

DESCRIPTION OF SPECIFIC EMBODIMENTS OF THE INVENTION

Figure 1:
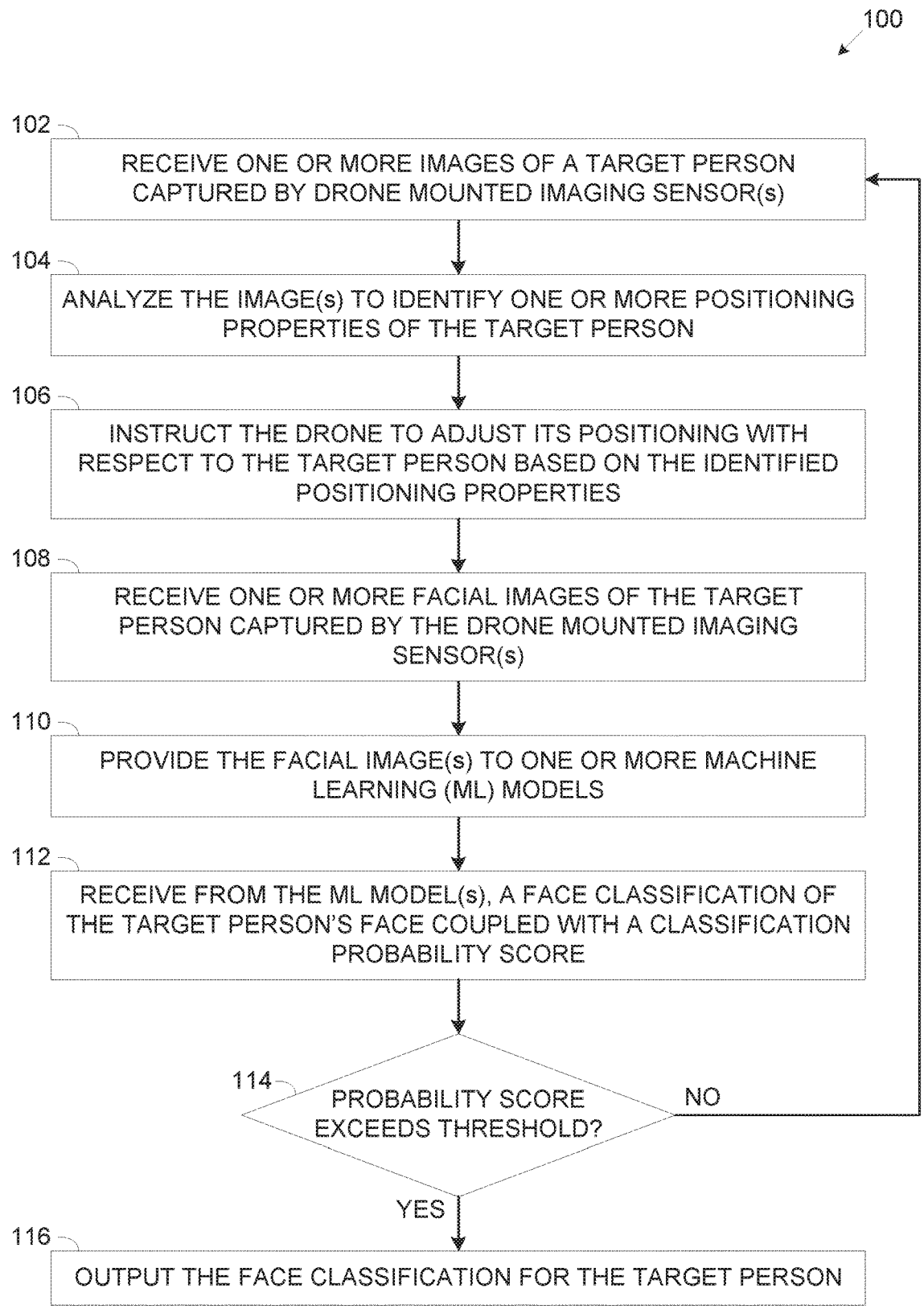
FIG. 1 is a flowchart of an exemplary process of enhancing classification of a face of a target person depicted in images captured by drone mounted imaging sensors by dynamically positioning the drone to improve visibility of the face in the images, according to some embodiments of the present invention.

The present invention, in some embodiments thereof, relates to face recognition based on image analysis, and, more specifically, but not exclusively, to enhancing face recognition based on image analysis by dynamically adapting a position of a drone to improve visibility of the face in images captured by drone mounted imaging sensors.

According to some embodiments of the present invention, there are provided methods, systems and computer program products for enhancing classification of a face of a target person depicted in images captured by drone mounted imaging sensors by dynamically and adaptively positioning the drone to improve visibility of the face in the images. The drone mounted with one or more imaging sensors, for example, a camera, a video camera, a night vision camera, an Infrared camera, a thermal camera and/or the like may be therefore dynamically maneuvered to one or more positions with respect to the target person which are estimated to be optimal for capturing better visibility, higher quality and/or increased accuracy images of the target person's face.

Moreover, the drone may be operated in an iterative process in which the drone may be repositioned in a plurality of iterations and additional images of the target person's face may be captured from a plurality of optimal image capturing positions until the target person may be classified and recognized with a sufficient degree of confidence.

During each iteration, one or more images of the target person captured by the imaging sensor(s) mounted on the drone may be analyzed to identify one or more positioning properties which may affect the visibility, quality and/or accuracy of facial images captured by the imaging sensor(s)

to depict the face of the target person, for example, a line of sight between the imaging sensor(s) and the face of the target person, visibility of the face of the target person and/or the like. The positioning property(s) may therefore have major impact on the ability to accurately classify and recognize the face of the target person based on analysis of the captured image(s).

The positioning properties may relate to the target person, specifically to a head pose of the target person, to one or more objects in the environment of the target person which may potentially block the line of sight between the imaging sensor(s) and the face of the target person, to one or more environmental parameters (e.g. illumination parameters, precipitation, etc.) and/or the like.

Based on analysis of the positioning properties, the drone may be repositioned at an estimated optimal image capturing position to improve visibility, quality and/or resolution of the facial images of the target person captured by the imaging sensor(s).

The captured facial images may be processed by one or more classifiers as known in the art, for example, a Machine Learning (ML) model such as, for example, a neural network, a Support Vector Machine (SVM) and/or the like trained to classify and recognize human faces, in particular the face of the target person. The ML model(s) may further compute a probability score indicating a probability of correct classification of the target person's face which may reflect a confidence level of correctly recognizing the target person and correctly determining his identity.

During each iteration the probability score may be compared to a certain threshold defining the classification confidence level required for correctly recognizing the target person. In case the probability score fails to exceed the threshold another iteration may be initiated to reposition the drone in another optimal image capturing position and capture additional facial images of the target person's face which may be further processed by the ML model(s) until the confidence level threshold is met.

Optionally, the probability score computed in a plurality of iterations may be aggregated to produce an aggregated probability score which may be compared against the threshold.

Optionally, the drone may be operated in a plurality of iterations to capture the face of the target person from a plurality of view angles in order to form a Three Dimensional (3D) representation of at least part of the face and/or head of the target person.

Optionally, the image processing based recognition of the target person is supplemented by one or more additional authentication methods, for example, a manual signature of the target person, a biometric authentication of the target person, a voice authentication of the target person and/or the like.

The classification of the target person may be then provided to one or more face recognition based systems, for example, an automated delivery service, a security system, a surveillance system and/or the like which may use the classification (identity) of the target person for authentication and/or recognizing of one or more target persons monitored and captured by the drone mounted imaging sensor(s).

Authenticating the target person based on images captured from optimal image capturing positions selected based on analysis of the positioning properties may present major advantages compared to existing methods and system for face recognition and people authentication.

First, most if not all of the face recognition based systems, services and platforms rely on automated face recognition which must be reliable and robust and compromising the face recognition reliability and confidence may significantly undermine such automated systems and services and may potentially render them useless. It is therefore essential to ensure a high confidence level and reliable classification and recognition for the automated process applied to classify and recognize people faces.

Since the target person may move his head, his face may be positioned in a direction which may prevent the imaging sensor(s) from capturing high visibility and/or high quality facial images of the target person. Therefore, analyzing the images to identify the head pose of the target person and position the drone in a position which enables a direct line of sight between the imaging sensor(s) and the face of the target person may enable capturing increased visibility and/or quality facial images of the target person which may in turn enable the ML model(s) to classify the target person with higher confidence level.

Moreover, the environment in which the target person needs to be recognized may also present major limitations for capturing quality facial images which may allow the ML model(s) to correctly classify target persons with high confidence level. Various environments such as urban areas for example, may be populated with many objects which may potentially block the line of sight between the drone mounted imaging sensor(s) and the face of the target person. Analyzing the images depicting the environment of the target person to identify the positioning properties relating to the potentially blocking object(s) may therefore enable to position the drone in a position which avoids the object(s) and enables a clear line of sight between the imaging sensor(s) and the face of the target person.

Furthermore, the environmental parameters (e.g. illumination, rain, snow, etc.) may have further impact on the quality of the facial images of the target person and may significantly degrade them. Therefore, analyzing the images to identify the environmental parameters and operate the drone to a position which overcomes the limitations imposed by the environmental parameters may enable capturing increased visibility and/or quality facial images of the target person which may enable the ML model(s) to classify the target person with higher confidence level.

In addition, forming the 3D representation of the face and/or head of the target person using facial images captured from a plurality of view angles may significantly improve immunity to fraud attacks initiated in attempt to impersonate as the genuine target person using a false representation of the target person, for example, through a printed image and/or a picture portrayed on a digital display. Since such representations are typically Two Dimensional (2D), creating and analyzing the 3D representation of the face and/or head of the target person may easily reveal whether the identified face is a fraudulent representation of the target person's face or the genuine face of the target person.

Therefore, adjusting the drone positioning to optimal image capturing positions enabling its mounted imaging sensor(s) to capture high visibility facial images of the target person may support using less complex ML model(s), for example, neural networks which are simpler (less deep) compared to the ML models used by the existing face recognition methods and system while maintaining high face recognition accuracy, reliability and robustness. This may significantly reduce the computing resources required for executing the reduced complexity ML model(s), for example, processing resources, storage resources, processing time and/or the like thus reducing time, costs and/or effort for deploying the ML model(s). Moreover, the reduced complexity ML model(s) may be trained using significantly reduced computing resources thus further reducing time, costs and/or effort for deploying the ML model(s).

Moreover, by capturing high visibility facial images of the target person the imaging sensors mounted on the drone may be lower end and more cost effective sensors having significantly lower quality and/or resolution compared to high end imaging sensors required by the face recognition methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of enhancing classification of a face of a target person depicted in images captured by drone mounted imaging sensors by dynamically positioning the drone to improve visibility of the face in the images, according to some embodiments of the present invention.

An exemplary process 100 may be executed to adaptively and dynamically maneuver a drone mounted with one or more imaging sensors to position the drone with respect to a target person in a position optimized for capturing improved and better visibility images of the target person's face. Moreover, the process 100 may be an iterative process in which the drone may be repositioned in a plurality of iterations and additional images of the target person's face may be captured until the target person may be classified and recognized with sufficient degree of confidence.

Figure 2:
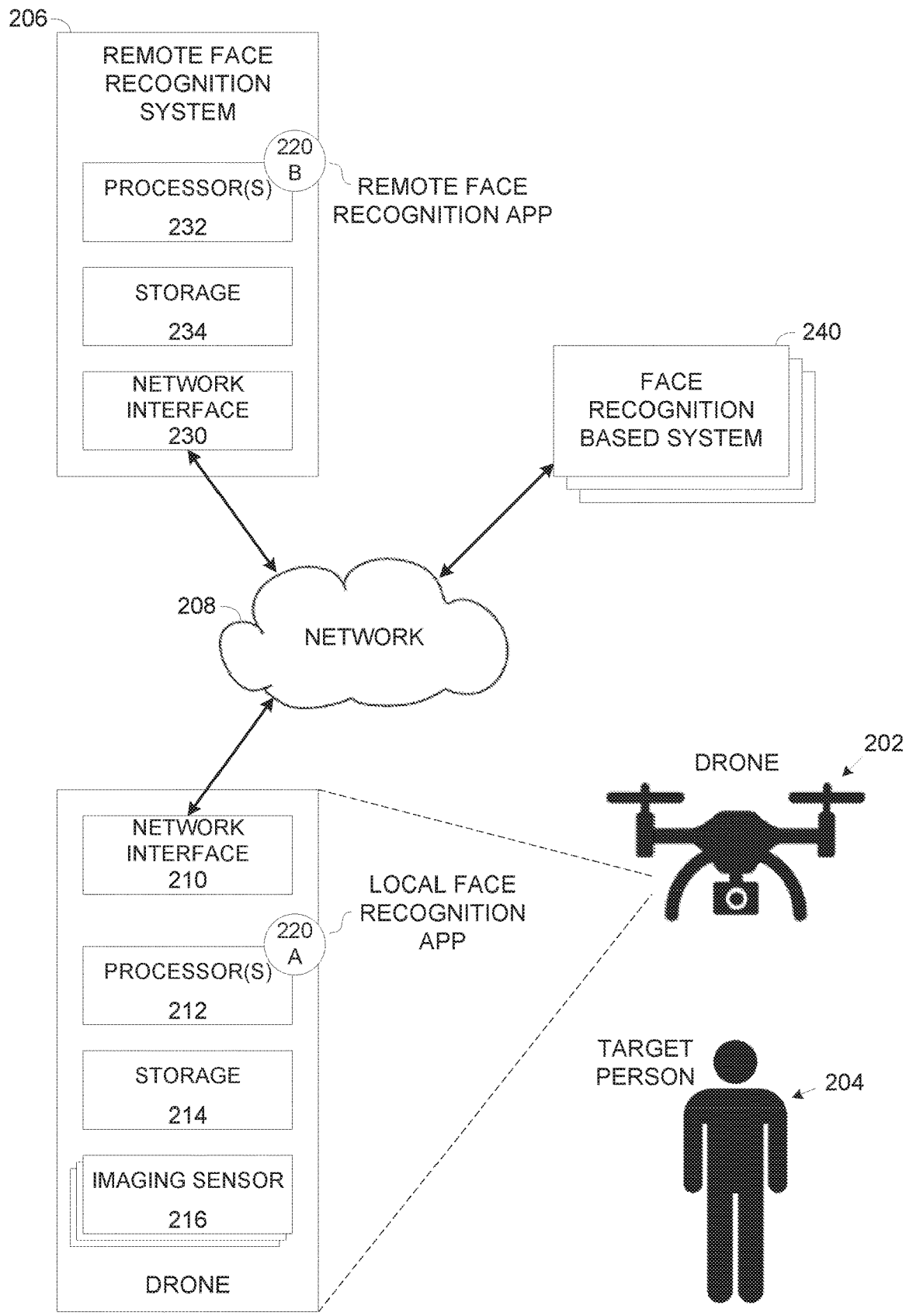
FIG. 2 is a schematic illustration of an exemplary system for enhancing classification of a face of a target person depicted in images captured by drone mounted imaging sensors by dynamically positioning the drone to improve visibility of the face in the images, according to some embodiments of the present invention.

Reference is also made to FIG. 2, which is a schematic illustration of an exemplary system for enhancing classification of a face of a target person depicted in images captured by drone mounted imaging sensors by dynamically positioning the drone to improve visibility of the face in the images, according to some embodiments of the present invention. An exemplary system may be deployed for adaptively and dynamically maneuvering a drone 202 mounted with one or more imaging sensors 216 to position the drone 202 with respect to a target person 204 in a position optimized for capturing improved and better visibility images of the face of the target person 204 and thus enable accurate recognition of the target person 204.

The drone 202 mounted with the imaging sensor(s) 216, for example, a camera, a video camera, a night vision camera, an Infrared camera, a thermal camera and/or the like may further comprise a network interface 210 for connecting to a network 208, a processor(s) 212 for executing the process 100 and/or part thereof, and a storage 214 for storing data and/or program (program store).

The network interface 210 may include one or more wireless network and/or communication interfaces, for example, a Wireless Local Area Network (WLAN) interface, a cellular interface and/or the like to enable the drone 202 to communicate with one or more remote network resources via the network 208. The network 208 may comprise one or more wired and/or wireless networks, for example, a Local Area Network (LAN), a WLAN, a Wide Area Network (WAN), a Municipal Area Network (MAN), a cellular network, the internet and/or the like.

The processor(s) 212, homogenous or heterogeneous, may include one or more processors arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache memory and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a local face recognition application (app) 220A for executing the process 100 and/or part thereof. The local face recognition app 220A may optionally utilize and/or facilitate one or more hardware elements integrated and/or utilized in the drone 202, for example, a circuit, a component, an Integrated Circuit (IC), an Application Specific Integrated Circuit (ASIC), a Field Programmable Gate Array (FPGA), a Digital Signals Processor (DSP) and/or the like.

Optionally, the process 100 and/or part thereof is executed by one or more remote face recognition systems 206, for example, a computer, a server, a computing node, a cluster of computing nodes and/or the like connected to the network 208 and communicating with the drone 202. The remote face recognition system 206 may comprise a network interface 230 for connecting to the network 208, a processor(s) 232 such as the processor(s) 212 for executing the process 100 and/or part thereof, and a storage 234 such as the storage 214 for storing data and/or program (program store).

The network interface 230 may include one or more wired and/or wireless network interfaces, for example, a LAN interface, a WLAN interface, a WAN interface, a MAN interface, a cellular network interface and/or the like for connecting to the network 208 and enabling the remote face recognition system 206 to communicate with one or more remote network resources, in particular with the drone 202. In addition to the persistent and/or volatile memory resources, the storage 234 may further include one or more network storage resources, for example, a storage server, a network accessible storage (NAS), a network drive, a cloud storage and/or the like accessible via the network interface 230.

The processor(s) 232 may execute one or more software modules each comprising a plurality of program instructions stored in a non-transitory medium (program store) such as the storage 234 and executed by one or more processors such as the processor(s) 232. For example, the processor(s) 232 may execute a remote face recognition app 220B for executing the process 100 and/or part thereof. The remote face recognition app 220B may optionally utilize and/or facilitate one or more hardware elements integrated and/or utilized in the remote face recognition systems 206, for example, a circuit, a component, an IC, an ASIC, an FPGA, a DSP and/or the like.

Optionally, the remote face recognition system 206 and/or the remote face recognition app 220B executed by the face recognition system 206 are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Moreover, in some embodiments of the present invention, the process 100 may be executed jointly by the local face recognition app 220A and the remote face recognition app 220B such that one or more steps of the process 100 are executed by the local face recognition app 220A and one or more other steps of the process 100 are executed by the remote face recognition app 220B. For example, the local face recognition app 220A may control operation of the drone 202 and/or the imaging sensor(s) 216 and transmit the captured images to the remote face recognition app 220B which may apply the ML model(s) to analyze the images and recognize the target person 204. Therefore, for brevity, a single and/or unified face recognition app 220 is designated herein for executing the process 100 which may comprise the local face recognition app 220A, the remote face recognition app 220B and/or any combination thereof.

The face recognition app 220 may provide the classification of the target person 204, in particular, the recognition results of the target person 204, for example, the identity of the target person 204 to one or more face recognition based systems 240, for example, an automated delivery service which is deployed to deliver goods, mail and/or the like to the target person via the drone 202. The face recognition based system(s) 240 may be connected to the network 208 such that the face recognition app 220 may communicate with the face recognition based system(s) 240 via the network 208 to provide, i.e., transmit the classification (identity) of the target person 204 to the face recognition based system(s) 240.

Optionally, one or more of the face recognition based systems 240 integrate the remote face recognition system 206.

The process 100 and the system presented in FIG. 2 describe a single drone 202 and a single target person 204. However, this should not be construed as limiting as the process may be extended for a plurality of drones such as the drone 202 and/or a plurality of target persons such as the target person 204.

As shown at 102, the process 100 starts with the face recognition app 220 receiving one or more images captured by one or more of the imaging sensors 216 mounted on the drone 202. In particular, the image(s) are captured to depict the target person 204 while the drone 202 is operated, maneuvered and/or positioned to approach the target person 204.

As shown at 104, the face recognition app 220 may analyze the captured image(s) depicting the target person 204 to identify one or more positioning properties of the target person 204 which may affect image capturing of the target person 204 by the imaging sensor(s) 216 mounted on the drone 202. The face recognition app 220 may employ one or more methods, techniques and/or algorithms as known in the art for analyzing the captured image(s) to identify and extract the positioning property(s), for example, image processing, computer vision, ML based classification and/or the like.

In particular, the face recognition app 220 may analyze the captured image(s) to identify positioning property(s) which may affect image capturing of the face of the target person 204, for example, a line of sight of the imaging sensor(s) 216 to the face of the target person 204, visibility of the face of the target person 204 and/or the like. The positioning property(s) may therefore have major impact on the ability to accurately classify and recognize the face of the target person 204 based on analysis of the captured image(s).

For example, one or more of the positioning properties may relate to the target person 204 himself, for example, one or more of the positioning properties may express a head pose of the target person 204. The face recognition app 220 may analyze the captured image(s) to identify the head pose of the target person 204 which may be expressed in one or more spatial representations, for example, yaw, pitch and roll. For example, the face recognition app 220 may identify the head pose of the target person 204 expressed in six dimensions as known in the art by three translations, three rotations and a rotation order. In another example, the face recognition app 220 may identify the head pose of the target person 204 expressed in six dimensions by three translations and four quaternions.

In another example, one or more of the positioning properties may relate to one or more objects in the environment of the target person 204, specifically blocking objects which may potentially block the line of sight between the imaging sensor(s) 216 mounted on the drone 202 and the face of the target person 204. As such one or more of the positioning properties may express one or more properties such as, for example, a location, shape, width, height and/or the like of one or more objects, for example, a structure, a vehicle, a pole, a tree and/or the like which may potentially block and/or obscure at least partially the line of sight between the drone mounted imaging sensor(s) 216 and the target person 204, specifically the line of sight to the face of the target person 204. In another example, the face recognition app 220 may analyze the captured image(s) to identify that the target person 204 is wearing a hat, a hood, and/or the like which may block at least partially the line of sight between the imaging sensor(s) 216 and the face of the target person 204.

In another example, one or more of the positioning properties may relate to one or more environmental parameters, for example, illumination parameters, rain and/or the like. As such one or more of the positioning properties may express an illumination level of the target person 204, specifically illumination level of the face of the target person 204 which may affect visibility and/or quality of the face image depicted in the captured images(s). In another example, one or more of the positioning properties may express existence of precipitation, for example, rain, snow and/or the like which may affect visibility and/or quality of the face image depicted in the captured images(s).

As shown at 106, the face recognition app 220 may instruct the drone 202 to adjust its position with respect to the target person 204 to a position which is estimated by the face recognition app 220, based on analysis of the identified positioning property(s), to be an optimal facial capturing position from which the imaging sensor(s) 204 may capture higher visibility, increased quality and/or improved accuracy images of the face of the target person 204.

The optimal facial capturing position may be defined by one or more spatial position parameters of the drone 202, for example, a location of the drone 202 with respect to the target person 204, a distance of the drone 202 from the target person 204, an altitude of the drone 202 with respect to the target person 204, a view angle (of the line of sight) of the imaging sensor(s) 216 mounted on the drone 202 with respect to the face or head pose identified for the target person 204 and/or the like.

The face recognition app 220 may instruct the drone 202 to reposition, maneuver and/or approach the optimal facial capturing position by communicating with one or more operation and/or navigation systems controlling the operation and movement of the drone 202. For example, the face recognition app 220 may transmit the coordinates of the optimal facial capturing position to the navigation system of the drone 202 and instruct the navigation system to reposition the drone in the transmitted coordinates.

For example, assuming that based on the head pose of the target person 204 identified by analyzing the captured image(s), the face recognition app 220 determines that the face of the target person 204 is facing a certain direction which is not aligned with a line of sight between the imaging sensor(s) 216 and the face of the target person 204. In such case, the face recognition app 220 may instruct the drone 202 to reposition along a line extending perpendicularly from the face of the target person 204 to the certain direction to enable the imaging sensor(s) 216 to capture higher visibility, increased quality and/or improved accuracy images of the face of the target person 204.

In another example, assuming that based on the identified positioning property(s), the face recognition app 220 determines that the target person 204 is wearing a baseball cap which blocks at least partially the line of sight between the imaging sensor(s) 216 and the face of the target person 204 while the drone 202 is located in its current position which may be at least slightly elevated with respect to the face of the target person 204. In such case, the face recognition app 220 may instruct the drone 202 to reposition at a lower altitude position with respect to the target person 204 such that the baseball cap does not interfere with the line of sight between the drone mounted imaging sensor(s) 216 and the face of the target person 204 to enable the imaging sensor(s) 216 to capture higher visibility, increased quality and/or improved accuracy images of the face of the target person 204.

In another example, assuming that based on the identified positioning property(s), the face recognition app 220 determines that a certain structure, for example, a building balcony is blocking at least partially the line of sight between the imaging sensor(s) 216 and the face of the target person 204 while the drone 202 is located in its current position. In such case, the face recognition app 220 may instruct the drone 202 to reposition at a different position, location, altitude which is estimated by the face recognition app 220 to have a clear line of sight to the face of the target person 204, specifically with respect to the building balcony to enable the imaging sensor(s) 216 to capture higher visibility, increased quality and/or improved accuracy images of the face of the target person 204.

In another example, assuming that based on the identified positioning property(s), the face recognition app 220 determines that it is currently raining and the rain obscures at least partially the face of the target person 204. In such case, the face recognition app 220 may instruct the drone 202 to reposition at a closer position to the target person 204 which is estimated by the face recognition app 220 to be sufficiently close to enable the imaging sensor(s) 216 to capture higher visibility, increased quality and/or improved accuracy images of the face of the target person 204. In another example, assuming that based on the identified positioning property(s), the face recognition app 220 determines that the face of the target person is illuminated only from a certain direction. In such case, the face recognition app 220 may instruct the drone 202 to reposition at a different position in the direction of the illumination source with respect to the target person 204 which is therefore estimated by the face recognition app 220 to enable the imaging sensor(s) 216 to higher visibility, increased quality and/or improved accuracy images of the face of the target person 204 under improved illumination conditions.

Optionally, based on analysis of the identified positioning property(s), the face recognition app 220 may instruct the drone 202 to adjust one or more operational parameters of the imaging sensor(s) 216, for example, a resolution, a zoom, a color, a field of view, an aperture, a shutter speed, a sensitivity (ISO), a white balance, an auto exposure and/or the like. For example, assuming that the optimal image capturing position selected by the face recognition app 220 based on the identified positioning property(s) is relatively far from the target person 204. In such case the face recognition app 220 may instruct increasing the zoom of the imaging sensor(s) 216 to capture a higher quality and/or increased visibility of the face of the target person 204. In another example, assuming that according to the identified positioning property(s) the face of the target person 204 is illuminated with little illumination. In such case the face recognition app 220 may instruct increasing the shutter speed of the imaging sensor(s) 216 to enable more light to penetrate the sensor and thus capture a higher quality and/or increased visibility of the face of the target person 204.

As shown at 108, the face recognition app 220 may receive one or more facial images of the target person 204 captured by the imaging sensor(s) 216 after the drone 202 has positioned itself at the optimal image capturing position identified and/or estimated by the face recognition app 220.

As shown at 110, the face recognition app 220 may provide, transmit and/or output one or more of the facial images of the target person 204 to one or more classifiers as known in the art, for example, an ML model such as, for example, a neural network, an SVM and/or the like trained to classify and recognize human faces, specifically the face of the target person 204. The ML model(s) may be utilized by one or more trained neural networks, for example, a Convolutional Neural Network (CNN) as known in the art which is highly efficient for image analysis applied for object detection and/or face classification and recognition.

As known in the art, the ML model(s) are configured and trained to extract feature vectors from the images and classify the extracted feature vectors to respective classes (labels), for example, an identifier (identity) of the target person according to matching of the feature vectors with feature vectors extracted from training images of the target person 204 processed and learned by the ML model(s) during their training phase.

The ML model(s) may typically compute a probability score (confidence score) indicating a probability (confidence level) of correct classification of the face of the target person 204 and hence the probability and confidence of correctly recognizing the target person 204.

The probability score expressing confidence of the correct recognition may be interpreted as the distance between the feature vector(s) extracted from the facial image(s) of the target person 204 captured by the imaging sensor(s) 216 from the optimal image capturing position and feature vectors which are extracted from training facial images of the target person 204 which were used to train the ML model(s). For example, as known in the art, cosine similarity may be measured between feature vectors $A \cdot B$ extracted from facial image(s) of the target person 204 captured by the imaging sensor(s) 216 and $\|A\|$ $\|B\sim$ extracted from the training facial image(s) of the target person 204 as follows: $A \cdot B = \|A\| \|B\| \cos \Theta$. In such implementation, the higher the value of $\Theta$ the lower is the confidence of correct classification and recognition, i.e., the lower is the probability score and vice versa, the lower the value of $\Theta$ the higher is the confidence of correct classification and recognition, i.e., the higher is the probability score.

As shown at 112, the face recognition app 220 may receive from the ML model(s) the classification, i.e., the label of the face of target person 204 which may include the identity of the target person 204 associated with the probability score computed by the ML model(s) to express the confidence of correctly classifying and recognizing the target person 204.

As shown at 114, which is a conditional step, the face recognition app 220 may compare the probability score computed by the ML model(s) for the classification of the face of the target person 204 to a certain threshold defined to ensure sufficient confidence that the target person 204 is correctly recognized.

In case the probability score exceeds the threshold, the face recognition app 220 may determine that the target person 204 is recognized with high confidence and the process 100 may branch to 116. However, in case the probability score does not exceed the threshold, the face recognition app 220 may determine that the target person 204 is not recognized with sufficient confidence and the process 100 may branch to 102 to initiate another iteration for repositioning the drone 202 in another optimal image capturing position which is estimated by the face recognition app 220 to enable the imaging sensor(s) 204 to capture the face of the target person 204 with increased visibility, quality and/or accuracy.

The threshold used by the face recognition app 220 to evaluate and/or determine successful recognition of the target person may be predefined. However, according to some embodiments of the present invention, the threshold may not be static and absolute but rather adjustable dynamically according to one or more parameters, for example, quality of the captured facial images and/or the like.

Optionally, the face recognition app 220 and/or the ML model(s) may aggregate the probability score computed in a plurality of iterations of the process 100, i.e., based on facial images captured by the imaging sensor(s) 216 from a plurality of optimal image capturing positions estimated by the face recognition app 220 in the plurality of iterations. The face recognition app 220 may therefore compare the aggregated probability score to the threshold in order to determine whether the target person 204 is recognized with a sufficiently high confidence level.

Optionally, the face recognition app 220 may initiate a plurality of iterations to instruct the drone to reposition in a plurality of positions with respect to the target person 204 in order to capture a plurality of facial images depicting the face of the target person 204 from a plurality of view angles to form an at least partial 3D representation of at least part of the head and/or the face of the target person 204. This may enable the face recognition app 220 and/or the ML model(s) to detect and possibly prevent potential frauds in which a malicious party may attempt to fraudulently impersonate as the target person 204 by presenting the face of the target user 204 via one or more Two Dimensional (2D) means, for example, a picture of the target user 204 printed on a page, portrayed on a screen of a device (e.g. a tablet, etc.) and/or the like. Creating the at least partial 3D model of the head and/or face of the target person 204 may enable the face recognition app 220 and/or the ML model(s) to identify that the face is a 2D dimensional presentation and may be thus invalid. Moreover, a scenario in which the drone 202 is moving but a head pose of the target person 204 as identified by the face recognition app 220 identifies does not change with respect to the moving drone 202 may be highly indicative of a potential fraud.

As shown at 116, after determining that the target person 204 is recognized with a sufficient confidence1 level, the face recognition app 220 may output the classification of the target person 204, for example, the identity of the target person 204 to one or more of the face recognition based systems 240.

According to some embodiments of the present invention, the face recognition based system 240 is an automated delivery service which uses drones such as the drone 202 to deliver goods, for example, products, mail and/or the like to target persons 240 registered to the service.

The automated delivery service 240 may therefore use the classification of the target user 204, i.e., the identity of the target user to authenticate the identity of the target person 204 to whom the goods should be delivered. This means that assuming the drone 202 carries goods for delivery to the target person 204, the automated delivery service 240 may first authenticate the target person 204 based on the classification received from the face recognition app 220 to verify that the target person 204 detected by the drone 202 is indeed the same person to whom the goods should be delivered. After authenticating the identity of the target person 204, the drone may be operated and/or instructed to actually deliver the goods to the target person 204.

Optionally, the face recognition app 220 may, optionally in response to a request from the automated delivery service 240, initiate one or more iterations of the process 100 to capture one or more images of the target person 204 in correlation with the goods at the time of delivery and/or after delivered to the target person 204. For example, the face recognition app 220 may initiate one or more iterations of the process 100 to capture image(s) of the target person 204 receiving the goods from the drone 202, holding the goods, the goods located next to the target person 204 and/or the like. Such images may be logged and optionally used as evidence of delivery of the goods to the target person 204.

Optionally, the delivery point (location) where the drone 202 delivers the goods to the target person 204 (after authenticated) is different from the optimal image capturing position selected during one or more iterations of the process 100. After recognizing the target person 204 with sufficient confidence level, i.e., the probability score exceeds the threshold, the face recognition app 220 may instruct the drone 202 to maneuver to another location—a delivery point, where the drone 202 may deliver the goods to the target person 204. This may enable the face recognition app 220 to select the optimal image capturing position(s) to enable the ML model(s) to recognize the target person 204 with sufficient confidence before moving to the delivery point.

Optionally, the face recognition app 220 employs one or more additional authentication sequences, methods and/or means for authenticating the target person 204 in order to verify his identity and ensure that he is the genuine target person to whom the goods should be delivered. The additional authentication sequences, methods and/or means may include, for example, a manual signature of the target person 204, a biometric authentication of the target person 204, a voice authentication of the target person 204 and/or the like. For example, after authenticating the target person 204 with sufficient confidence level, the face recognition app 220 may instruct the drone 202 to maneuver to a certain position in close proximity to the target person 204 and initiate one or more biometric authentications. For example, the drone 202 may be operated to instruct the target person 204 to sign his name on a digital surface or a touchscreen integrated in the drone 202. The signature may be then analyzed in comparison to a reference signature of the target person 204 stored and available from the automated delivery system 240. In another example, the drone 202 may be operated to instruct the target person 204 to place his finger on a finger print reader integrated in the drone 202. The finger print of the target person 204 may be then analyzed in comparison to a reference finger print of the target person 204 stored and available from the automated delivery system 240. In another example, the drone 202 may be operated to instruct the target person 204 to say a few words and/or a predefined sequence of words which may be captured and recorded by one or more audio input device (e.g. microphone) integrated in the drone 202. The recorded speech of the target person 204 may be then analyzed in comparison to a reference speech of the target person 204 stored and available from the automated delivery system 240.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of increasing reliability of face recognition in analysis of images captured by drone mounted imaging sensors, comprising:

recognizing a target person in at least one iteration comprising:
identifying at least one positioning property of the target person based on analysis of at least one image captured by at least one imaging sensor mounted on a drone operated to approach the target person, the at least one imaging sensor locally controlled at the drone,
instructing the drone to adjust its position to an optimal facial image capturing position selected based on the at least one positioning property,
receiving at least one facial image of the target person captured by the at least one imaging sensor while the drone is located at the optimal facial image capturing position,
receiving a face classification associated with a probability score from at least one machine learning model trained to recognize the target person which is applied to the at least one facial image, wherein the at least one machine learning model is executed by at least one remote system connected to the drone via at least one network,
calculating an updated aggregated probability score by accumulating the probability score received in a current iteration of the at least one iteration to an aggregated score calculated before said current iteration such that in each iteration said aggregated probability score is increased by an amount of said probability score received in the current iteration, and initiating another iteration in case the aggregated probability score does not exceed a certain threshold; and outputting the face classification for use by at least one face recognition based system, wherein the operation of the drone is controlled locally at the drone.

2. The computer implemented method of claim 1, wherein the at least one positioning property is a member of a group consisting of: a head pose of the target person, a property of at least one potentially blocking object with respect to the target person and at least one environmental parameter affecting image capturing of the target person.

3. The computer implemented method of claim 2, wherein the optimal facial image capturing position is defined by at least one position parameter of the drone, the at least one position parameter is a member of a group consisting of: a location of the drone with respect to the target person, a distance of the drone from the target person, an altitude of the drone with respect to the target person and a view angle of the at least one imaging sensor mounted on the drone with respect to the head pose identified for the target person.

4. The computer implemented method of claim 1, further comprising adjusting at least one operational parameter of the at least one imaging sensor based on the at least one positioning property, the at least one operational parameter is a member of a group consisting of: a resolution, a zoom, a color, a field of view, an aperture, a shutter speed, a sensitivity (ISO), a white balance and an auto exposure.

5. The computer implemented method of claim 1, wherein the at least one machine learning model is based on a neural network.

6. The computer implemented method of claim 1, wherein at least part of the face classification is done by the at least one remote system connected to the drone via at least one network to receive the at least one image captured by the at least one imaging sensor mounted on the drone.

7. The computer implemented method of claim 1, further comprising initiating a plurality of iterations to capture a plurality of facial images depicting the face of the target person from a plurality of view angles to form an at least partial three dimensional (3D) representation of at least part of a head of the target person.

8. The computer implemented method of claim 1, wherein the face recognition based system is an automated delivery system using the face classification for authenticating an identity of the target person for delivery of goods to the target person.

9. The computer implemented method of claim 8, further comprising initiating the at least one iteration for recognizing the target person in correlation with the goods at a time of delivery.

10. The computer implemented method of claim 9, further comprising a location of the target person where the at least one image is captured for recognizing the target person is different form the location of the target person during the time of delivery.

11. The computer implemented method of claim 8, further comprising instructing the drone to initiate at least one additional authentication sequence which is a member of a group consisting of: manual signature of the target person, a biometric authentication of the target person and a voice authentication of the target person.

12. A system for increasing reliability of face recognition in analysis of images captured by drone mounted imaging sensors, comprising:

at least one processor executing a code, the code comprising:

code instructions to recognize a target person in at least one iteration comprising:

identifying at least one positioning property of the target person based on analysis of at least one image captured by at least one imaging sensor mounted on a drone located in operated to approach the target person, the at least one imaging sensor locally controlled at the drone, instructing the drone to adjust its position to an optimal facial image capturing position selected based on the at least one positioning property, receiving at least one facial image of the target person captured by the at least one imaging sensor while the drone is located at the optimal facial image capturing position, receiving a face classification associated with a probability score from at least one machine learning model trained to recognize the target person which is applied to the at least one facial image, wherein the at least one machine learning model is executed by at least one remote system connected to the drone via at least one network, calculating an updated aggregated probability score by accumulating the probability score received in a current iteration of the at least one iteration to said aggregated score calculated before said current iteration such that in each iteration said aggregated probability score is increased by an amount of said probability score received in the current iteration, and initiating another iteration in case the aggregated probability score does not exceed a certain threshold; and code instructions to output the face classification for use by at least one face recognition based system, wherein the operation of the drone is controlled locally at the drone.

* * * * *